United States Patent [19]

Ebbins et al.

[11] Patent Number: 5,116,507
[45] Date of Patent: May 26, 1992

[54] TREATMENT FOR REDUCING IMPURITIES IN AQUEOUS LIQUOR

[75] Inventors: James R. Ebbins, Dunfermline; Simon F. Lopez, Glenrothes; Christopher Taylor, Kinross, all of United Kingdom

[73] Assignee: British Gas plc, London, England

[21] Appl. No.: 545,650

[22] Filed: Jun. 29, 1990

[30] Foreign Application Priority Data

Jul. 19, 1989 [GB] United Kingdom ............... 8916486

[51] Int. Cl.$^5$ ............................................. B01D 61/04
[52] U.S. Cl. ..................................... 210/639; 210/652
[58] Field of Search ............... 210/652, 718, 737, 750, 210/766, 774, 639, 638

[56] References Cited

U.S. PATENT DOCUMENTS

| 4,170,550 | 10/1979 | Kamody | 210/23 H |
| 4,606,830 | 8/1986 | Cleaver et al. | 210/766 X |

FOREIGN PATENT DOCUMENTS

| 95144 | 11/1983 | European Pat. Off. |
| 3532390 | 6/1986 | Fed. Rep. of Germany |
| 58-17887 | 2/1983 | Japan |

Primary Examiner—Frank Spear
Attorney, Agent, or Firm—Oblon, Spivak, McClelland, Maier & Neustadt

[57] ABSTRACT

The invention relates to a method of treating an aqueous liquor, such as effluent liquor formed during coal gasification. The method comprises subjecting the liquor to dephenolation and ammonia stripping treatment to remove phenolic compounds and "free" ammonia from the liquor and then subjecting the resulting liquor, which still contains ammonium compounds and thus "fixed" ammonia, to reverse osmosis treatment to produce a permeate which is substantially free from impurities, including "fixed" ammonia.

8 Claims, 1 Drawing Sheet

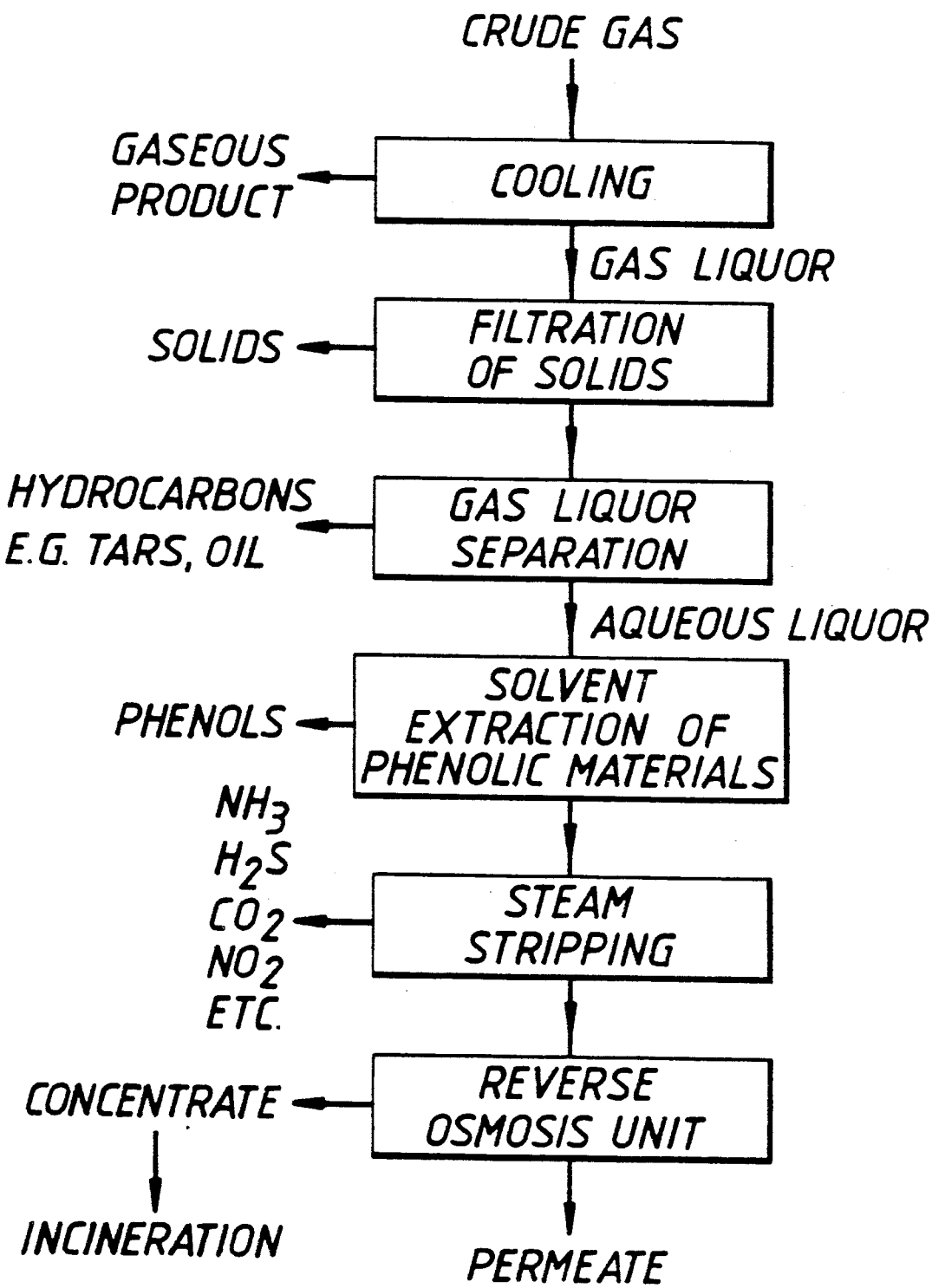

TREATMENT FOR REDUCING IMPURITIES IN AQUEOUS LIQUOR

The present invention relates to the treatment of aqueous liquors, such as effluent liquors formed during coal gasification processes.

In known coal gasification processes for producing hydrogen and methane containing product gases, hot crude gas from the gasifier may also contain tar, entrained solids, steam, phenols and chlorine- nitrogen- and sulphur- containing compounds. The crude gas is cooled to produce a condensed gas phase comprising, on the one hand, hydrocarbons, basically tars and oil and, on the other hand, aqueous liquor containing most of the other impurities. Before such aqueous liquor can be discharged to a waterway or reused within the gasification plant it has to be treated or purified.

A known treatment route previously used by the present Applicants basically comprises the following stages:

Stage 1 — subjecting the aqueous liquor (after separation from the condensed hydrocarbons) to solvent extraction treatment to remove phenolic compounds therefrom, for example by known liquid/-liquid extraction methods;

Stage 2 — removing from the dephenolated liquor, 'free' ammonia and dissolved gases such as hydrogen sulphide and carbon dioxide by steam 'stripping';

Stage 3 — adding alkali to the liquor resulting from stage 2 to convert 1 fixed ' ammonia (present principally as ammonium chloride) to 'free' ammonia and removing the latter by steam 'stripping';

Stage 4 — biologically treating the liquor resulting from stage 3 to oxidise and thereby degrade remaining organic compounds; and Stage 5 — using activated carbon to adsorb from the liquor resulting from stage 4 residual compounds, mainly organics, and thereby substantially remove the remaining pollutants in the liquor.

Applicants found that the resulting upgraded aqueous liquid effluent produced by the above treatment route could still contain sufficient amounts of chlorides which would have to be removed in one or more additional stages before the upgraded effluent could be reused as, say, cooling water make-up, boiler feed water or released to an inland waterway. Where necessary such chloride content of the liquor could be substantially reduced by various further methods, such as, evaporation, use of multi-stage flash desalination equipment or mechanical vapour recompression. Such methods may be energy intensive and may add greatly to the cost of the treatment of the aqueous liquor.

Applicants have now investigated the use of reverse osmosis to replacing one or more stages in the above treatment route.

Applicants investigations, surprisingly, showed that reverse osmosis treatment could satisfactorily replace above-mentioned stages 3, 4 and 5 (and any further chloride-removal stage). Thus, whilst 'free' ammonia, that is dissolved ammonia per se, is removed from the liquor in stage 2, the liquor which is subjected to reverse osmosis still contains 'fixed' ammonia, that is ammonia forming part of an ammonium compound, such as ammonium chloride.

The ease by which a separation may be carried out by reverse osmosis is dependent partly upon the natural osmotic pressure of the liquor being treated and the applied pressure in the reverse osmosis apparatus. The natural osmotic pressure of the liquor is dependent on the dissolved material content of the liquor and it was considered that the earlier the liquor was extracted from the known treatment route described earlier, the higher the dissolved solid content and therefore the higher the osmostic pressure would be, which would tend to disfavour the reverse osmosis process. With the knowledge in mind, the Applicants unexpectedly found that the quality of purity of the permeate from the reverse osmosis treatment when the latter replaced stages 3, 4 and 5 (and any additional stage) was substantially the same or very similar to that found when the same reverse osmosis treatment process replaced stage 5 or stages 4 and 5 (and any additional stage).

Applicants believe that there are various reasons or factors which contribute to the unexpected result. In the applicants novel process, alkali is not added to the aqueous liquor, as in stage 3 of the known treatment route where such addition of alkali increases the dissolved solid content of the liquor to disfavour the reverse osmosis process. Thus, the absence of the addition of alkali and avoidance of increased dissolved solid content favours the reverse osmosis process. Also, after 'free' ammonia stripping, the 'fixed' ammonia is present in salt form, such as ammonium chloride, which has a higher molecular weight compared to free ammonia which can be present to some extent in the biologically oxidised liquor or the dephenolated and ammonia (free and fixed) stripped liquor of the known treatment route. The presence of ammonia in the higher molecular weight salt form has been found to favour the rejection of the salt bound ammonia by the reverse osmosis membrane whilst it has been found that lower molecular weight 'free' ammonia tends to pass more readily or straight through a semi-permeable membrane. Moreover, after the 'free' ammonia stripping process the natural process condition of the liquor has a relatively low pH, for example pH3 or pH4, and is relatively hot, for example about 60° C., and both these conditions have been found to favour the reverse osmosis process, that is to favour the rejection of impurities and favour permeate flux or flow through the semi-permeable membrane.

According to the invention a method of treating an aqueous liquor containing impurities comprising phenolic compounds, ammonia, ammonium compounds, dissolved gases and residual organic materials, comprises subjecting the liquor to dephenolation and ammonia stripping treatment and thereafter subjecting the liquor resulting from the dephenolation and ammonia stripping treatment (such resulting liquor still containing ammonium compounds) to reverse osmosis treatment to produce a)- a permeate which is substantially free from, or contains substantially reduced amounts of, the impurities and b)- a concentrate containing the remaining amounts of the impurities.

The dephenolation and ammonia stripping treatment may comprise initially dephenolating the liquor and then subjecting the dephenolated liquor to the ammonia stripping treatment. However, much of the phenols can be removed by stripping with steam, so an alternative arrangement could be a single steam stripping stage to remove or substantially reduce the dissolved gases and to remove some of the phenols, the remaining phenols being removed in the reverse osmosis stage.

The aqueous liquor containing the impurities may comprise aqueous effluent separated from gas condensate resulting or obtained from the cooling of crude product gas produced from a carbonaceous material, such as a coal gasification process.

Conveniently, the aqueous liquor or gas condensate is filtered prior to the reverse osmosis treatment.

When subjected to the reverse osmosis treatment, the aqueous liquor is preferably at a temperature in the range 30° C. to 70° C., and more preferably in the range 40° C. to 60° C.

Preferably, when the aqueous liquor is subject to the reverse osmosis treatment it has a pH of between 3 and 7, and more preferably between 4 and 6.

The concentrate resulting from the reverse osmosis treatment may be disposed of by a) direct release to the environment, b) release after evaporation and crystallisation or c) incinerated. The solid residue from b) may also be regarded as a by-product finding use for say road de-icing.

An Example incorporating the method according to the invention will now be described with reference to the accompanying drawing which shows a flow chart illustrating the stages in the example.

EXAMPLE

Crude gas produced by a coal gasification process using Pittsburgh 8 coal carried out in a slagging gasifier, is cooled to produce a gas liquor condensate comprising hydrocarbons and an aqueous liquor. The gas liquor is filtered to remove solids and the hydrocarbons and aqueous liquor fractions are then separated. The aqueous liquor is dephenolated using a ketone solvent (methyl iso butyl ketone). The dephenolated liquor is steam stripped of free ammonia, hydrogen sulphide and other easily removed dissolved gases, e.g. carbon dioxide. The resulting dephenolated and stripped liquor (still containing 'fixed' ammonia) is filtered and then subjected to reverse osmosis in a reverse osmosis unit.

In an alternative procedure, the dissolved gas stripping and partial dephenolation may be effected in a single stage by stripping the liquor with steam. Dephenolation treatment is then completed by the reverse osmosis stage.

The unit used in the example was a tubular type manufactured by Paterson Candy International Ltd. with a ZF99 polyamide type semi-permeable membrane.

The reverse osmosis treatment produced a permeate which was substantially free from or containing substantially reduced amounts of the original impurities and which premeate was suitable for direct (i.e. without further treatment) discharge into an inland waterway or for reuse as an aqueous source in the gasification process. A concentrate of impurities was also produced by the reverse osmosis and this was subjected to incineration treatment.

The dephenolated, free ammonia stripped liquor subjected to the reverse osmosis process was at a temperature of about 40° C. and had a pH of about 5.7.

The volume concentration factor was about 5, whilst the flux at this concentration factor was 38l/m².hr.

The applied pressure on the liquor in the reverse osmosis unit was 60 barg.

The concentrations of components or impurities in the raw liquor (i.e. the aqueous liquor as separated from the 'tar' condensate), the dephenolated free ammonia stripped liquor and the permeate from the reverse osmosis unit are shown in Table 1.

TABLE 1

| | CONCENTRATION IN LIQUOR (mg/l) | | |
|---|---|---|---|
| COMPONENT | Raw Liquor | Dephenolated Free Ammonia Stripped | Permeate From RO Unit |
| Ammonia | 7687 | 1510 | 79 |
| Chloride | 1079 | 1079 | 98.5 |
| Phenol | 5392 | — | — |
| Sulphate | 287 | 52 | 0.5 |
| Thiocyanate | 823 | 1059 | 83.0 |
| Carbon (TOC) | 5500 | 1174 | 150 |
| Chemical Oxygen Demand | 19776 | 3960 | 272 |

As can be appreciated from Table 1, the concentration of ammonia in the crude gas liquor is reduced to approx. 20% by the dephenolating and free ammonia stripping processes and to approx. 1% in the permeate resulting from the reverse osmosis treatment. It can also be seen how effective the reverse osmosis treatment is in lowering the concentration of chloride which is reduced to about 9% of the chloride concentration in the crude liquor. The effectiveness of the reverse osmosis process in removing sulphate is also clearly apparent.

The replacement of the final three stages (and any subsequent stage) in the known treatment route by the reverse osmosis treatment step can have important financial and technical implications. Thus, the total operating and capital costs may be reduced, whilst the biological treatment stage, which is believed to be the least guaranteeable or reliable stage of the earlier treatment route, has been completely eliminated.

We claim:

1. A method of treating an aqueous liquor containing impurities comprising phenolic compounds, ammonia, ammonium compounds, dissolved gases and residual organic materials, which method is undertaken in the absence of alkali treatment and comprises subjecting the liquor to dephenolation and ammonia stripping treatment and thereafter subjecting the resulting dephenolated and ammonia stripped liquor (still containing ammonium compounds) to reverse osmosis treatment to produce (a) a permeate which is substantially free from, or contains substantially reduced amounts of, the impurities and (b) a concentrate containing the remaining amounts of the impurities.

2. A method as claimed in claim 1, wherein the aqueous liquor containing the impurities comprises aqueous effluent separated from gas condensate resulting from the cooling of crude produce gas produced by a carbonaceous material gasification process.

3. A method as claimed in claim 1 or claim 2, wherein the concentrate is incinerated.

4. A method as claimed in claim 1, wherein the aqueous liquor or gas condensate is filtered prior to the reverse osmosis treatment.

5. A method as claimed in claim 1, wherein the dephenolation and ammonia striping treatment comprises initially dephenolating the liquor and then subjecting the dephenolated liquor to the ammonia stripping treatment.

6. A method as claimed in claim 1, wherein the crude aqueous liquor is treated in a single steam stripping stage where dissolved gas removal and some dephenolation occurs.

7. A method as claimed in claim 1, wherein the aqueous liquor is at a temperature of 70° C. or less when subjected to the reverse osmosis treatment.

8. A method as claimed in claim 1, wherein the aqueous liquor has a pH of between 3 and 7 when subjected to the reverse osmosis treatment.

* * * * *